Dec. 6, 1938.  W. C. JACKSON  2,139,307
SPLASH GUARD AND CLAMP THEREFOR
Filed Oct. 28, 1937  2 Sheets-Sheet 1
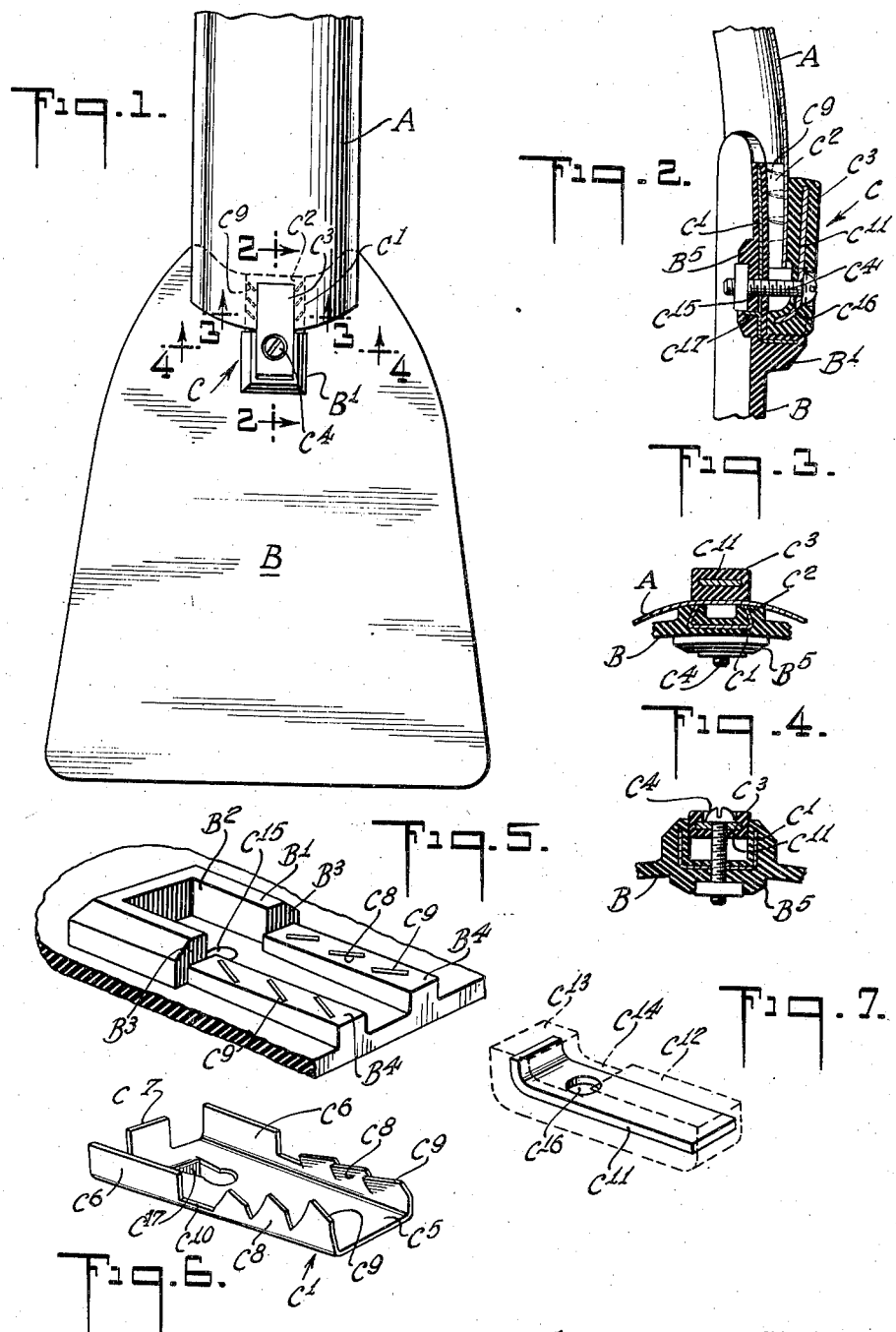

Dec. 6, 1938.  W. C. JACKSON  2,139,307
SPLASH GUARD AND CLAMP THEREFOR
Filed Oct. 28, 1937  2 Sheets-Sheet 2
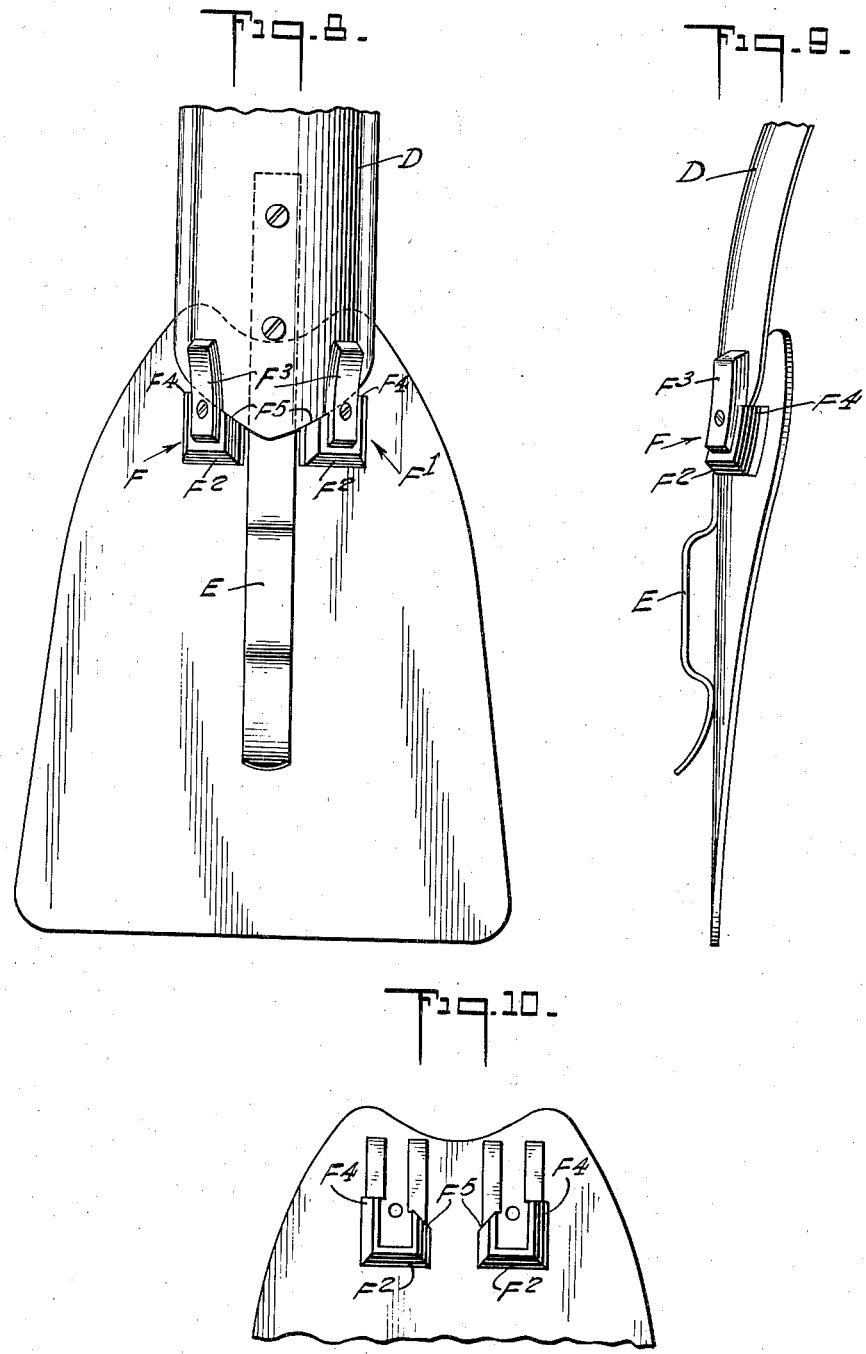
INVENTOR
Walter C. Jackson
BY
Morrison, Kennedy & Campbell
ATTORNEYS Patented Dec. 6, 1938

2,139,307

UNITED STATES PATENT OFFICE 2,139,307

SPLASH GUARD AND CLAMP THEREFOR

Walter C. Jackson, Rahway, N. J., assignor to Tingley Reliance Rubber Corporation, a corporation of New Jersey Application October 28, 1937, Serial No. 171,430

14 Claims. (Cl. 280—152.1)

This invention relates to splash guards of the type adapted to be attached at the lower end of a bicycle or motorcycle fender and to a clamp suitable for effecting such attachment.

In accordance with the present invention, there is provided a flexible apron, preferably of vulcanized rubber and provided in its upper central portion with a clamp, by means of which the apron can be secured to the fender at its lower edge. The clamp, in its preferred form, consists of two parts, one adapted frictionally to engage the inner face of the fender, and the other frictionally to engage the outer face of the fender, together with means for drawing the two parts together to effect such frictional engagement.

The clamp member which engages the inner face of the fender is formed of metal and is embedded in the rubber apron. Near its center, this member presents a pair of shoulders arranged to engage the fender at its lower edge so as properly to locate the apron with respect thereto. The upper part of this clamp member extends above the lower edge of the fender and is formed with a plurality of pairs of ears having edges that are or will become exposed through the rubber and which engage the inner face of the fender. These exposed edges of the respective ears of each pair are disposed angularly with respect to each other so that, when the ears are urged tightly into frictional engagement with the fender, they will, because of their peculiar disposition, tend to prevent movement of the clamp, and consequently the apron, either longitudinally or laterally with respect to the fender, or as a matter of fact, in any direction with respect thereto.

Beneath the lower edge of the fender, the apron is formed with a U-shaped pocket, open at the top and which is reinforced in the sides and bottom by a portion of the clamp member just referred to. This pocket serves properly to locate a second member of the clamp which has a portion extending above the lower edge of the fender for engagement with the outer face thereof. This latter or outer member of the clamp preferably is made of molded rubber with a metal reinforcing element embedded therein and formed at its lower end with a portion curving inwardly toward the inner member of the clamp and which serves as a fulcrum point; whereby, as the parts of the clamp are drawn together, sufficient pressure will be transmitted through their upper portions to hold the splash guard tightly in place on the fender. The members of the clamp are drawn together by bolt and nut means which passes through both members of the clamp and beneath the lower edge of the fender, the improved construction thus facilitating the attachment of a splash guard to a fender without the necessity of drilling or otherwise marring the latter.

In one of the embodiments, the splash guard arrangement has been illustrated in association with a bicycle or motorcycle fender which is devoid of a stand retaining clip, and here one clamp located at the upper center of the apron will suffice. In another embodiment, the splash guard arrangement has been illustrated in association with a fender which does have a stand retaining clip, two clamps preferably being shown, located one at each side of the clip. Obviously, the invention is equally applicable for use with an automobile fender flap, in which case two clamps would be used, located one adjacent each of the upper corners of the flap. The improved arrangement is of an exceedingly simple nature, which greatly facilitates its manufacture and installation and is of particular utility with fenders that are devoid of beads at their lower edges. Other advantages will be apparent as the description of the invention proceeds.

Referring to the drawings:

Fig. 1 is a rear elevation of a splash guard equipped with the present improvements, and showing it in association with the fender of a bicycle or motorcycle;

Fig. 2 is a vertical sectional view taken on line 2—2 of Fig. 1;

Fig. 3 is a horizontal sectional view taken on line 3—3 of Fig. 1;

Fig. 4 is a horizontal section taken on line 4—4 of Fig. 1;

Fig. 5 is a perspective view of the upper portion of the splash guard, wherein one element of the clamp is embedded;

Fig. 6 is a perspective view of the element of the clamp member which is embedded in the splash guard apron;

Fig. 7 is a perspective view of the outer element of the clamp;

Fig. 8 is a rear elevation of a splash guard equipped with another embodiment of the present improvements;

Fig. 9 is a side elevation of the splash guard shown in Fig. 8; and

Fig. 10 is a rear elevation of the upper portion of the splash guard shown in Fig. 8, and with the separable clamp elements removed.

As shown in Fig. 1, the fender splash guard in service is secured at the lower edge of a fender A (herein illustrated as of the type used on bicycles or motorcycles) and includes an apron B extending downwardly therefrom. The apron at its upper edge is adjacent the inner face of the fender and is frictionally held in place by means of a clamp C, which, in the preferred form illustrated, comprises two parts, one, a member $C^1$ embedded in the apron and which has a portion $C^2$ (Figs. 1, 2 and 3) located adjacent the inner face of the fender, and the other, a member $C^3$, preferably although not necessarily, separate from the apron and which has a portion located adjacent the outer face of the fender, and a bolt $C^4$ for drawing the parts together into close frictional contact with the opposite faces of the fender.

Near its upper edge, the apron (see Figs. 1 and 5) is formed with a raised U-shaped portion $B^1$ presenting a pocket $B^2$, the purpose of which will hereinafter be described, a pair of shoulders $B^3$ adapted to engage the lower edge of the fender and thus properly locate the apron, and a pair of relatively lower spaced parallel portions $B^4$ presenting surfaces that engage the inner face of the fender. This raised U-shaped portion of the apron is reinforced by the clamp member $C^1$ (see Figs. 2, 3, 4 and 6), a channeled metal piece having a flat body portion $C^5$, two relatively high bent-up side portions $C^6$ and a bent-up end portion $C^7$, these bent-up portions serving to reinforce the raised U-shaped portion $B^1$ of the apron at the sides and end, the relatively high side wall members $C^6$ terminating at one end adjacent the faces of the shoulders $B^3$ which serve to locate the apron in place. The member $C^1$, at its other end, namely, in the region contiguous to the fender when the splash guard is in service, is formed at its lateral edges with a series of upstanding ears $C^8$, the upper edges $C^9$ of which terminate in the surface of the raised members $B^4$, that is, they are exposed through the rubber or will penetrate through the rubber (to become exposed) when pressure is applied. It will be observed that these ears are twisted so that the exposed edges of each corresponding or opposed pair slope downwardly and inwardly when the guard is in service. Furthermore, the side walls of the member $C^1$ between the bent-up portions $C^6$ and the ears $C^8$ are relatively low, as at $C^{10}$, to avoid contact at these points with the face of the fender. Also, the ears $C^8$ progressively increase in height towards the top. The purpose of these features will be explained later on.

The outer member $C^3$ of the clamp is formed of molded rubber with a metal insert $C^{11}$ to give it strength. The upper portion of this member (see Figs. 2 and 7) presents a substantially flat surface $C^{12}$ adapted to engage the rear or outer face of the fender A, whereas the lower portion extends forwardly, presenting a nose $C^{13}$ adapted to be received in the recess $B^2$. The nose portion, at its lower end, in service, rests against the end wall of the recess, while the front face thereof bears against the base or bottom wall of the recess. Between the surface $C^{12}$ and the nose portion $C^{13}$, the member is recessed as at $C^{14}$, so that said surface will not overlap the lower edge of the fender.

Both members of the clamp (Figs. 2, 5 and 7) are provided with registering holes $C^{15}$, $C^{16}$ to accommodate the bolt $C^4$ which acts to draw the members together when the guard is mounted on the fender. The rubber of the member $C^3$ in the vicinity of the bolt head is cut away, so that the latter will have a bearing directly upon the metal strengthening member $C^{11}$. It will also be noted (see Figs. 2, 3 and 4) that the apron B is formed at the rear and near the top with a boss $B^5$ having a square recess to accommodate the nut which is threaded on the bolt, and in this connection it will be observed that the element $C^1$ presents a forwardly extending horizontal ear $C^{17}$ located at the base of the square recess, so as to engage one edge of the nut to prevent it from turning.

In mounting the guard on the fender, the bolt $C^4$ is first backed up so as to permit the fender to be inserted between the members $C^1$ and $C^3$, the guard being pushed upwardly until the lower edge of the fender engages the shoulders $B^3$. The bolt which is located below the edge of the fender is then tightened, causing the exposed edges $C^9$ of the ears $C^8$ of the member $C^1$ to engage tightly against the inner face of the fender and the flat surface $C^{12}$ of the member $C^3$ to engage the outer face of the fender, both members in a sense being fulcrumed one on the other by virtue of the nose portion with which the member $C^3$ is provided.

As is well known, fenders of the type herein dealt with are somewhat curved at their lower edges, the curve following that of the wheel periphery. The outer member $C^3$ of the clamp, since it is made of molded rubber, will readily follow the contour of the fender. The inner member $C^1$ will also conform to the curved contour of the fender, by virtue of its resilience. When the splash guard is in place, the outer exposed edges $C^9$ of the ears on the inner member $C^1$ will engage tightly against the inner face of the fender, exerting a substantially uniform pressure because of their being progressively higher toward the top (see Fig. 2). Depending upon the pressure applied by the bolt $C^4$, these ears at their edges will tend to bite into the fender and, because of their angular disposition, will act to resist to the utmost any tendency of the splash guard to be pulled off downwardly or to be moved laterally of the fender. Further, it will be observed that, inasmuch as the pressure of the outer member $C^3$ is applied centrally of the two rows of ears, a downward pull on the apron B will tend to move the ears inwardly, since, in their movement, they will tend to follow a path coincidental with their straight line edges. Should there be any movement of the ears on the member $C^1$ toward one another, a corresponding bulging movement of the ear bridging portion $C^5$, which is in spaced relation with the fender, will result, and this in itself will tend to augment the pressure exerted by the clamping members upon the fender, thus tending further to resist separation of the splash guard from the fender. Since the clamping elements provide for three regions of contact with the fender, namely, two, where the ears engage the inner face of the fender, and one, where the outer element engages the outer face of the fender, the clamp will accommodate itself to any fender, regardless of its transverse curvature. In other words, there are three spaced regions, parallel to each other, at which the clamping pressure is applied, one region located in one face of the fender and being intermediately disposed between two other regions located in the opposite face of the fender.

In Figs. 8, 9 and 10 another embodiment of the invention has been illustrated and which is suitable for use with a fender D to which there is attached a stand retaining clip E. In this embodiment, there are provided two clamping units F and F¹ located in spaced relation, so as to allow room for the clip to pass between them. These clamps are identical except for one being left and the other right and are substantially the same as the clamp in the embodiment previously described, except that in the case of each the boss F², presenting the pocket which receives the outer member F³, extends farther up at one side than at the other. The longer sides F⁴ of these bosses terminate at their upper ends somewhat below the edge of the fender, so as to provide clearance. The shorter sides of the bosses however, engage the lower edge of the fender and serve to locate the splash guard in place, it being noted that these sides at their upper ends are oppositely bevelled, as at F⁵, in order to conform to the contour of the fender edge.

Although the present invention has been illustrated in connection with a splash guard for a bicycle or a motorcycle, it may, as previously stated, be used in connection with a splash guard for an automobile fender.

In the accompanying drawings, the invention has been shown merely by way of example and in its preferred forms, and obviously many variations and modifications may be made therein which will still be comprised within its spirit. For instance, if desired, the two members of the clamp could actually be joined together at the bottom by a semi-rigid member, instead of being separated as in the illustrated embodiment and, where the claims specify two members, it is to be understood that such a construction is to be included within their scope, unless otherwise set forth. It is to be understood, therefore, that the invention is not limited to any specific form or embodiment, except insofar as such limitations are specified in the appended claims.

Having thus described my invention, what I claim is:

1. A clamp for securing a splash guard or other device to a fender at one edge thereof, said clamp including, in combination, a pair of members arranged frictionally to engage one on each side of said fender, and means acting to urge said members together to effect such frictional engagement, one of said members presenting at least one pair of spaced ears presenting metal engaging surfaces for engagement with one face of the fender and angularly disposed in opposite directions and with respect to a line formed by the intersection of the fender with a plane perpendicular to the fender edge where the clamp is secured.

2. A clamp for securing a splash guard or other device to a fender at one edge thereof, said clamp including, in combination, a pair of members arranged frictionally to engage one on each side of said fender, and means acting to urge said members together to effect such frictional engagement, one of said members presenting at least one pair of spaced ears presenting metal engaging surfaces for engagement with one face of the fender and angularly disposed in opposite directions and with respect to a line formed by the intersection of the fender with a plane perpendicular to the fender edge where the clamp is secured, and a bridge portion interconnecting said ears.

3. A clamp for securing a splash guard or other device to a fender at one edge thereof, said clamp including, in combination, a pair of separate members arranged frictionally to engage one on each side of said fender, and means acting to urge said members together to effect such frictional engagement, one of said members presenting a plurality of spaced ears presenting metal engaging surfaces for engagement with one face of the fender and angularly disposed in opposite directions and with respect to a line formed by the intersection of the fender with a plane perpendicular to the fender edge where the clamp is secured, said member also being provided with an ear located beyond the edge of the fender for determining the position of the other member of said clamp.

4. A clamp for securing a splash guard or other device to a fender at one edge thereof, said clamp including, in combination, a pair of members arranged frictionally to engage one on each side of said fender, and means acting to urge said members together to effect such frictional engagement, one of said members being embedded in rubber and presenting a plurality of spaced ears presenting metal engaging surfaces for engagement with one face of the fender and angularly disposed in opposite directions and with respect to a line formed by the intersection of the fender with a plane perpendicular to the fender edge where the clamp is secured.

5. A clamp for securing a splash guard or other device to a fender, said clamp including, in combination, a pair of members arranged frictionally to engage one on each side of said fender, and means acting to urge said members together to effect such frictional engagement, one of said members presenting a pair of ears located one at each of the marginal edges thereof and presenting metal engaging surfaces for engagement with one face of the fender, and a bridge portion interconnecting said ears, and the other of said members reacting against an extension of the bridge portion at a point below the edge of the fender.

6. A clamp for securing a splash guard or other device to a fender, said clamp including, in combination, a pair of members arranged frictionally to engage one on each side of said fender, and means acting to urge said members together to effect such frictional engagement, one of said members presenting a plurality of pairs of spaced ears presenting angularly disposed metal surfaces for engagement with one face of the fender, and a bridge portion interconnecting said ears, said ears having their metal surfaces presented at relatively different levels with respect to the bridge portion.

7. A clamp for securing a splash guard or other device to a fender and including, in combination, a member presenting edges in spaced relation for frictionally and conjointly engaging one face of the fender, a second member for frictionally engaging the other face of the fender, and means for urging the members together, whereby said members will engage the fender under pressure, the relative position of the second member with respect to the first member being such as to equalize the forces conjointly exerted through the spaced apart edges thereof.

8. A clamp for securing a splash guard or other device to a fender and including, in combination, a member presenting upstanding means for frictionally engaging one face of the fender, a second member for frictionally engaging the other face of the fender, and a draft instrumentality for urging the members together, whereby said members will engage the fender under pressure, said upstanding means being graduated in height with its higher points more remote from the draft instrumentality.

9. A splash guard adapted to be secured at the lower end of a fender, said guard including, in combination, an apron, and a clamp located at the upper edge thereof comprising two members, one embedded in the apron and arranged to engage one face of the fender and the other reacting thereagainst and arranged to engage the other face of the fender, means for urging said members into close frictional engagement with the fender, and a boss formed in the apron and presenting a pocket in which the second member seats, whereby relative movement between said member and the apron is prevented when the splash guard is in service.

10. A splash guard adapted to be secured at the lower end of a fender, said guard including, in combination, an apron, and a clamp located at the upper edge thereof comprising two members, one embedded in the apron and arranged to engage one face of the fender, and the other reacting thereagainst and arranged to engage the other face of the fender, means for urging said members into close frictional engagement with the fender, and a boss formed in the apron and presenting a pocket in which the second member seats whereby relative movement between said member and the apron is prevented when the splash guard is in service, said boss being reinforced by a portion of the first mentioned member.

11. A splash guard adapted to be secured at the lower end of a fender and including, in combination, an apron, and a clamp located at the upper edge thereof comprising two members, one embedded in the apron and arranged to engage one face of the fender, and the other reacting thereagainst and arranged to engage the other face of the fender, and bolt and nut means for urging the members together, said first mentioned member being provided with a lip to prevent one element of the bolt and nut means from turning when the splash guard is applied to the fender.

12. A splash guard adapted to be secured at the lower end of a fender and including, in combination, an apron, and a clamp located at the upper edge thereof comprising two members, one embedded in the apron and arranged to engage one face of the fender, and the other reacting thereagainst and arranged to engage the other face of the fender, and bolt and nut means for urging the members together, said apron being formed with a recessed boss to receive the nut and which is reinforced in one of its walls with a lip projecting from the first mentioned member to prevent the nut from turning when the splash guard is applied to the fender.

13. A splash guard adapted to be secured at the lower end of a fender and including, in combination, an apron, and clamp means located near its upper edge, one portion of the clamp means being embedded in the apron and another portion being separate therefrom, and recessed boss means for locating said separate portion, and serving also to locate the splash guard with respect to the fender.

14. A splash guard adapted to be secured at the lower end of a fender and including, in combination, an apron, a pair of clamping devices located near the upper edge thereof for securing the apron to the fender, said clamping devices including, each an element embedded in the apron and an element separate therefrom, and a pair of spaced recessed bosses formed in the apron for locating said separate elements, a portion of each boss serving also to locate the apron properly with respect to the fender.

WALTER C. JACKSON.